Dec. 29, 1953    J. L. HINSON    2,663,985
FORAGE HARVESTER
Filed Dec. 29, 1950    2 Sheets-Sheet 1

FIG. I

INVENTOR.
JAMES L. HINSON
BY
McMorrow, Berman + Davidson
ATTORNEYS

Dec. 29, 1953  J. L. HINSON  2,663,985
FORAGE HARVESTER
Filed Dec. 29, 1950　　　　　　　　　　　　　　　2 Sheets-Sheet 2
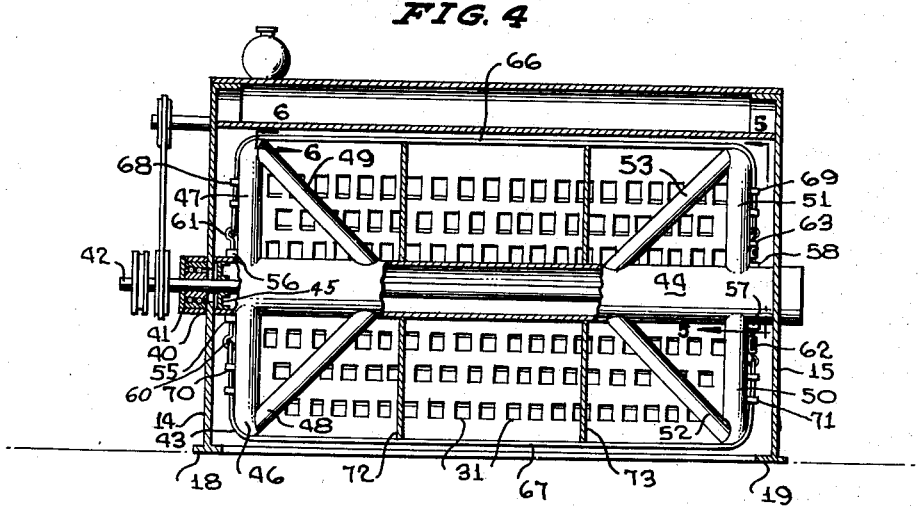
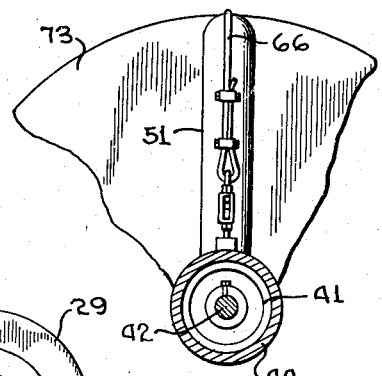
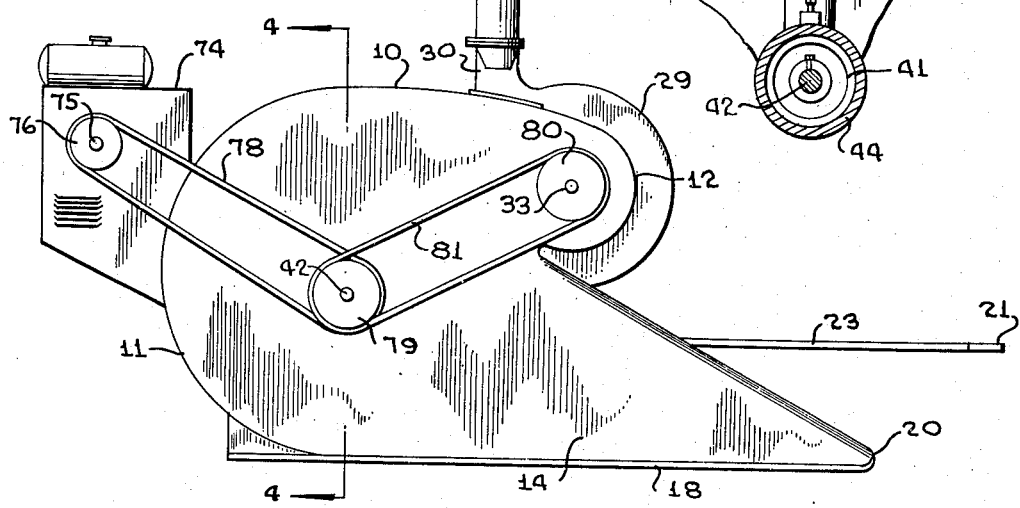
INVENTOR.
JAMES L. HINSON
BY
McMorrow, Berman & Davidson
ATTORNEYS Patented Dec. 29, 1953

2,663,985

UNITED STATES PATENT OFFICE 2,663,985

FORAGE HARVESTER

James L. Hinson, Winfield, Kans.

Application December 29, 1950, Serial No. 203,518

3 Claims. (Cl. 56—61)

This invention relates to harvesters and more particularly to a machine for harvesting forage crops, such as alfalfa.

It is among the objects of the invention to provide an improved forage harvester which cuts the forage material without the use of sharpened blades or metal to metal contact in its cutting mechanism; which utilizes inexpensive and easily replaceable wires or wire cables as the cutting elements and is not materially damaged by encountering solid obstructions, such as stones and stumps; which reduces the forage material to a comminuted or triturated condition for convenience in handling and drying and delivers the comminuted material through a suitable stack or duct to a material receiving vehicle; which is effective to sever tough stalks as well as the tender portions of the forage material; and which is simple and durable in construction, economical to manufacture, easy to repair and positive and efficient in operation.

Other objects and advantages will become apparent from a consideration of the following description and the appended claims in conjunction with the accompanying drawings wherein:

Figure 1 is a top plan view of a forage harvester illustrative of the invention, a portion being broken away and shown in cross section to better illustrate the construction of the harvester;

Figure 3 is an end elevational view of the forage harvester;

Figure 4 is a partial cross sectional view on the line 4—4 of Figure 3;

Figure 5 is an enlarged fragmentary cross sectional view on the line 5—5 of Figure 4;

Figure 6 is an enlarged fragmentary cross sectional view on an enlarged scale on the line 6—6 of Figure 4.

Figure 2:
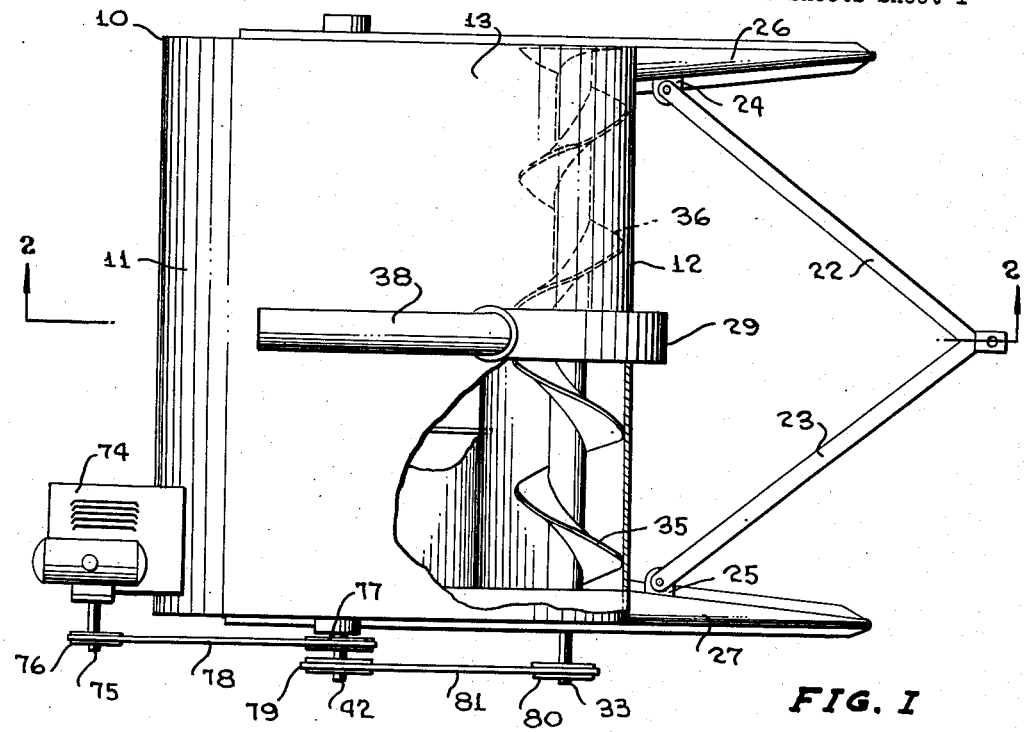
Figure 2 is a transverse cross sectional view on the line 2—2 of Figure 1.
Figure 7:
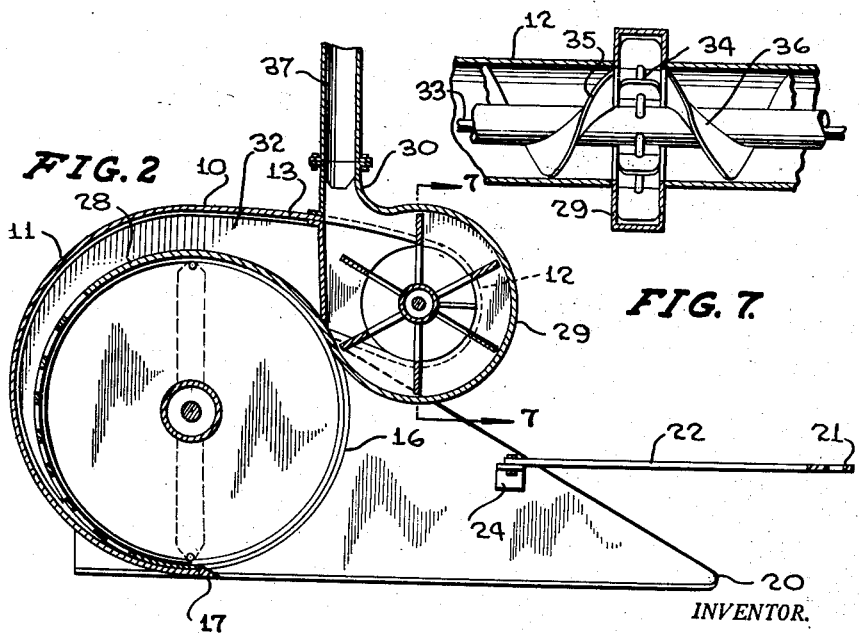
Figure 7 is a fragmentary cross sectional view on the line 7—7 of Figure 2.

With continued reference to the drawings, the harvester comprises a housing 10 including a partly cylindrical rear portion 11, a partly cylindrical upper front portion 12 joined to the rear portion 11 by a flat top portion 13 and end walls 14 and 15 disposed one at each end of the housing portions 11 and 12 and closing the opposite ends of these portions.

The rear portion 11 of the housing is discontinuous between the bottom of the upper front portion 12 and the end remote from the top wall 13 of a diameter of the rear portion 11 disposed substantially perpendicular to the top wall 13 to provide a front opening 16 in the housing rear portion 11 which front opening extends through an arc of approximately 90 degrees from the location at which the rear portion contacts or substantially contacts the ground when the device is in use to the bottom or adjacent side of the front portion 12 and an abutment bar 17 extends along and is secured to the edge of the rear housing portion 11 at the lower side of the front opening 16.

The end walls 14 and 15 have straight bottom edges provided with flanges, as indicated at 18 and 19 respectively, which extend from the lower portion of the rear part 11 of the housing forwardly beyond the front side of the front housing part 12 substantially parallel to the flat top wall 13 of the housing. The end walls are provided with extensions projecting forwardly of the front opening 16 of the housing part 11, these extensions having rearwardly and upwardly inclined top edges which extend to the lower side of the front housing part 12.

These end wall extensions constitute guides for deflecting the forage material into the front opening 16 of the housing and the flanges 18 and 19 constitute runners for the harvester disposed one at each end thereof, these flanges being curved upwardly at their front ends, as indicated at 20.

Some means for propelling the harvester are attached to the housing 10, the means illustrated being a tongue 21 connected by diagonal struts 22 and 23 to apertured lugs 24 and 25 secured to the end wall extensions and projecting inwardly from the inner side of these extensions near the front side of the housing.

The upper edges of the end wall extensions are preferably rolled over, as indicated at 26 and 27 in Figure 1, and tapered in a direction toward the front ends of the extensions to provide rounded surfaces which facilitate the passage of the forage material into the front opening of the housing.

A partly cylindrical screen or grid plate 28 is disposed within the rear part 11 of the housing eccentrically of the latter and is joined at one edge to the wall of the housing part 11 at the bottom end of the front opening 16 and has its other edge disposed at the top edge of the front opening 16 and joined to the bottom wall of the housing front part 12 at the lower rear edge of the wall of this housing part.

A generally cylindrical fan housing 29 is disposed in the front housing part 12 at the midlength location of the latter and is substantially coaxial therewith, and a tubular outlet 30 extends from the top of this fan housing above the top wall 13 of the harvester housing 10. The fan housing 29 is of larger diameter than the front portion 12 of the harvester housing and this fan housing extends downwardly somewhat below the top edge of the front opening 16, as illustrated in Figure 2.

The partly cylindrical plate 28 serves somewhat the same purpose as a hammermill screen and is provided with a large number of closely spaced apertures 31 through which the comminuted forage material is forced into the space 32 between the plate 28 and the harvester housing portion 11.

As is particularly illustrated in Figure 2, the space 32 increases uniformly in thickness from the bottom edge of the front opening 16 around the outer, rear side of the plate 28 to the rear side of the housing part 12 for the free passage of the material forced through the apertures in the plate 28 through this space and into the interior of the partly cylindrical front portion 12 of the harvester housing.

At each end of the front portion 12 of the housing the end walls 14 and 15 are provided with bearing apertures and a shaft 33 is journaled at its opposite ends in these apertures and is disposed coaxially of the housing part 12. A fan 34 is mounted on the shaft 33 and disposed within the fan housing 29 and oppositely directed augers 35 and 36 surround the shaft 33 between the fan housing and the end walls 14 and 15 respectively.

The augers move material passing through the apertures in the plate 28 and through the space 32 into the housing portion 12 into the fan housing at the respectively opposite sides of the housing and the fan forces this material by suction into the fan housing and then blows it upwardly through the tubular fan outlet 30. A stack 37 is secured at its lower end to the upper end of the outlet 30 and projects upwardly from the latter and a deflector 38 is pivotally mounted at one end on the upper end of the stack and is curved to extend laterally from the stack to direct the material blown by the fan through the stack 37 into a material receiving vehicle disposed at one end of the harvester.

The end walls 14 and 15 are provided coaxially of the partly cylindrical plate 28 with apertured housing 40 receiving antifriction bearings 41 and a shaft 42 is mounted at its ends in these bearings and journaled thereby in the end walls of the housing.

A reel or beater 43 is mounted on the shaft 42 between the end walls 14 and 15 and comprises a tube 44 through which the shaft 42 extends coaxially thereof and which is supported at its ends on the shaft by suitable spacer rings or sleeves 45.

Spokes 46 and 47 project radially outward from the tube near one end of the tube at diametrically opposite locations thereon and are disposed substantially perpendicular to the tube and in longitudinal alignment with each other.

A diagonal brace 48 extends from the outer end of the spoke 46 to the central tube 44 intermediate the length of the latter and a similar diagonal brace 49 extends from the outer end of the spoke 47 to the tube 44 adjacent the location at which the brace 48 is connected to the tube.

Spokes 50 and 51 project radially outward from the tube 44 near the other end of the tube at diametrically opposite locations on the tube and are disposed substantially perpendicular to the tube and in longitudinal alignment with each other. The spokes 46, 47, 50 and 51 are all of substantially the same length and diagonal braces 52 and 53 extend from the outer ends of the spokes 50 and 51 respectively to the central tube 44 intermediate the length of the tube.

The spokes 46, 47, 50 and 51 have their center lines substantially in a common plane including the axis of the central member 44 and the spokes, the central member and the diagonal braces 48, 49, 52 and 53 together constitute a rigid rotor frame journaled on the end walls 14 and 15 of the harvester housing for rapid rotation.

Lugs 55 and 56 are secured to the tube 44 adjacent the outer sides of the spokes 46 and 47 respectively, and similar lugs 57 and 58 are secured to the tube at the outer sides of the spokes 50 and 51. Hooks 60, 61, 62 and 63 are secured to and project radially outward from the lugs 55, 56, 57 and 58, and the outer ends of the spokes 46, 47, 50 and 51 are provided with transversely extending grooves, as indicated at 65 in Figure 6, extending substantially parallel to the axis of the tube 44.

A flexible strand 66, such as a wire cable, extends between the outer ends of the spokes 47 and 51 and is received in the grooves at the outer ends of these spokes, while a similar flexible strand, such as the wire cable 67 extends between the outer ends of the spokes 46 and 50 and is received in the grooves in the outer ends of these spokes. The ends of the cable 66 are connected to the hooks 61 and 63 by turnbuckles 68 and 69 respectively, and the ends of the cable 67 are connected to the hooks 60 and 62 by turnbuckles 70 and 71, respectively, so that the cables can be drawn tight between the outer ends of the corresponding spokes.

Discs 72 and 73 are coaxially mounted on the tube 44 substantially perpendicular to the tube with the disc 72 adjacent the inner ends of the diagonal braces 48 and 49 and the disc 73 adjacent the inner ends of the diagonal braces 52 and 53. The discs 72 and 73 are peripherally engaged with the cables 66 and 67 at spaced apart locations along the cables to hold the cables against bowing outwardly when the rotor is rapidly rotated.

A suitable power plant, such as a gasoline engine 74, is mounted on the rear of the harvester housing and has a drive shaft 75 provided with a belt pulley 76. A belt pulley 77 is mounted on the shaft 42 and connected by a belt 78 with the engine pulley 76 so that the shaft 42 will be driven by the engine to rotate the rotor 43.

A second belt pulley 79 is mounted on the shaft 42 and a belt pulley 80 is mounted on the shaft 33 and a belt 81 drivingly connects the pulley 79 to the pulley 80 so that the shaft 33 together with the augers 35 and 36 and the fan 34 will be driven simultaneously with the rotor 43.

During the operation of the harvester the rotor 43 is driven at a very rapid rate so that the cables 66 and 67 will strike or whip the forage plants and cut or break the plants into small pieces as the harvester moves progressively relative to the plants. Any tough plant stalks will be cut or broken off between the cables and the anvil or abutment bar 17 and the plant fragment will be forced by the cables through the apertures 31 in the screen plate 28, the plant fragments being reduced by this action to a predetermined maximum size.

Since the plants are cut or broken by the wire strands or cables, no sharpened knives or blades are necessary to harvest the forage material and no metal to metal contact of any cutting part is required. The rotor of this machine not only cuts the forage material, but also reduces it to a comminuted condition suitable for easy handling and drying, thereby saving an expensive step in the preparation of forage crops, such as alfalfa.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A forage harvesting machine comprising a housing of substantially semicylindrical shape adapted to be moved sidewise and having a front opening extending longitudinally from one end to the other end thereof and end walls closing the ends thereof, a screen plate of partly cylindrical shape having a longitudinal opening and spaced apart apertures therein disposed in said housing, said screen plate having a diameter less than the diameter of said housing and being eccentrically disposed in said housing with its edge at one side of the longitudinal opening therein joined to said housing along the bottom edge of the front opening in the latter to provide between said housing and said screen plate a space increasing in thickness from the bottom to the top edge of the front opening in said housing and opening between the top edge of said front opening and the adjacent edge of the opening in said screen plate, a rotatable beater journaled in said housing substantially coaxially of said screen plate for severing forage into short length particles and forcing severed forage particles through the apertures in said screen plate into said space, receptacle means carried by said housing adjacent the open end of said space to receive forage particles from the latter, and blower means disposed in said receptacle means for drawing forage particles from said space into said receptacle means and ejecting the forage particles from said receptacle means.

2. A forage harvesting machine comprising a housing having a longitudinally extending opening therein, a beater journaled in said housing for rotation therein adjacent said opening, a screen plate mounted in said housing and transversely curved to extend around said beater between the opposite edges of the opening in said housing at the side of said beater remote from said opening, said screen plate having spaced apart apertures therein for the passage therethrough of forage material broken up by said beater and being spaced from said housing to provide a space through which forage material passing through said screen plate can be removed from said housing, means providing a receptacle on said housing communicating with said space adjacent one edge of the opening in said housing, and blower means disposed in said receptacle and effective to draw material from said space into said receptacle and eject the forage material from said receptacle.

3. A forage harvesting machine comprising a housing having a longitudinally extending opening therein, a beater journaled in said housing for rotation therein adjacent said opening, a screen plate mounted in said housing and transversely curved to extend around said beater between the opposite edges of the opening in said housing at the side of said beater remote from said opening, said screen plate having spaced apart apertures therein for the passage therethrough of forage material broken up by said beater and being spaced from said housing to provide a space through which forage material passing through said screen plate can be removed from said housing, means providing a receptacle on said housing communicating with said space adjacent one edge of the opening in said housing, blower means disposed in said receptacle and effective to draw material from said space into said receptacle and eject the forage material from said receptacle, and conveyor means in said receptacle effective to move forage material in said receptacle into said blower means.

JAMES L. HINSON.

References Cited in the file of this patent

UNITED STATES PATENTS

| Number | Name | Date |
|---|---|---|
| 448,230 | Guichard | Mar. 17, 1891 |
| 719,482 | Maloney | Feb. 3, 1903 |
| 1,900,062 | Krenzke | Mar. 7, 1933 |
| 2,228,512 | Fish | Jan. 14, 1941 |
| 2,368,331 | Seaman | Jan. 30, 1945 |
| 2,496,493 | Raney | Feb. 7, 1950 |
| 2,531,732 | Hoffman | Nov. 28, 1950 |
| 2,556,446 | Roach | June 12, 1951 |